251-83 SR
FIP: 09/96 OR AI00142
M. Woodbury,
Globe Valve,
No. 142, A.I. Patented May 6, 1856.
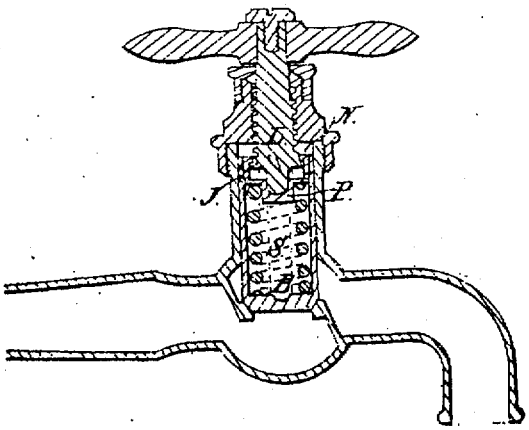
Witnesses.
J. Avery Richards
John L. Collyer
Inventor.
Moses Woodbury.

M. Woodbury,

P. 2

Globe Valve,

№142, A.I. Patented May 6, 1856.

L is screw J joint P flange step receiver
end of screw L N plug S cylinder

Claims screw L with leather cylindrical valve spring placed behind valve part B or valve body proper rises with extra pressure again allowing water to escape until pressure is reduced.